(12) United States Patent
Nunnink et al.

(10) Patent No.: US 8,134,116 B2
(45) Date of Patent: Mar. 13, 2012

(54) MODULAR FOCUS SYSTEM FOR IMAGE BASED CODE READERS

(75) Inventors: Laurens Nunnink, Simpelveld (NL); Richard Reuter, Wuerselen (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 12/352,109

(22) Filed: Jan. 12, 2009

(65) Prior Publication Data
US 2010/0176319 A1 Jul. 15, 2010

(51) Int. Cl.
*H01J 3/14* (2006.01)
(52) U.S. Cl. .......................... 250/234; 250/239
(58) Field of Classification Search .................. 250/239, 250/216, 234, 235, 208.1, 201.1–201.5; 235/454, 235/462.42, 462.22, 462.36, 462.43
See application file for complete search history.

(56) References Cited

U.S. PATENT DOCUMENTS

| | | |
|---|---|---|
| 3,940,777 A | 2/1976 | Komine |
| 4,072,396 A | 2/1978 | Ross |
| 4,160,590 A | 7/1979 | Reynard |
| 4,314,752 A | 2/1982 | Ishizaka et al. |
| 4,478,491 A | 10/1984 | Kawai |
| 4,490,018 A | 12/1984 | Yokotsuka |
| 4,494,828 A | 1/1985 | Masumoto et al. |
| 4,591,253 A | 5/1986 | Hecker et al. |
| 4,871,238 A | 10/1989 | Sato et al. |
| 4,877,949 A | 10/1989 | Danielson et al. |
| 5,019,699 A | 5/1991 | Koenck |
| 5,155,343 A | 10/1992 | Chandler et al. |
| 5,247,152 A | 9/1993 | Swartz et al. |
| 5,308,966 A | 5/1994 | Danielson et al. |
| 5,313,053 A | 5/1994 | Koenck et al. |
| 5,331,176 A | 7/1994 | San't Anselmo et al. |
| 5,331,178 A | 7/1994 | San't Anselmo et al. |
| 5,349,172 A | 9/1994 | Roustaei |
| 5,365,597 A | 11/1994 | Holeva |
| 5,378,883 A | 1/1995 | Batterman et al. |
| 5,399,846 A | 3/1995 | Pavlidis et al. |
| 5,471,043 A | 11/1995 | Knapp et al. |
| 5,473,150 A | 12/1995 | Huhn et al. |
| 5,500,516 A | 3/1996 | Durbin |
| 5,513,264 A | 4/1996 | Wang et al. |
| 5,569,902 A | 10/1996 | Wood et al. |
| 5,572,006 A | 11/1996 | Wang et al. |

(Continued)

FOREIGN PATENT DOCUMENTS

EP 00745951 12/1996

(Continued)

OTHER PUBLICATIONS

Notification of Transmittal of ISR and Written Opinion, International Search Report and Written Opinion for PCT/US2010/020584, mailed Mar. 22, 2010.

(Continued)

*Primary Examiner* — Que T Le
(74) *Attorney, Agent, or Firm* — Michael A. Jackolski (57) ABSTRACT

A modular focus system for image based code readers includes swappable lens attachments enables fixed focus, manual focus, and variable focus operation from a single reader. A manual focus lens cap includes a manually adjustable focus ring to change the focus of the reader. A variable focus lens module includes a liquid lens that is manipulated by a voltage delivered via a pair of electrodes to adjust the focus of the reader. The lens attachments can be swapped out and replaced as needed.

31 Claims, 5 Drawing Sheets

U.S. PATENT DOCUMENTS

| | | |
|---|---|---|
| 5,587,843 A | 12/1996 | Chen |
| 5,596,368 A | 1/1997 | Capper et al. |
| 5,598,007 A | 1/1997 | Bunce et al. |
| 5,627,360 A | 5/1997 | Rudeen |
| 5,640,001 A | 6/1997 | Danielson et al. |
| 5,659,167 A | 8/1997 | Wang et al. |
| 5,672,858 A | 9/1997 | Li et al. |
| 5,715,095 A | 2/1998 | Hiratsuka et al. |
| 5,734,153 A | 3/1998 | Swartz et al. |
| 5,756,981 A | 5/1998 | Roustaei et al. |
| 5,773,810 A | 6/1998 | Hussey et al. |
| 5,783,811 A | 7/1998 | Feng et al. |
| 5,786,582 A | 7/1998 | Roustaei |
| 5,786,586 A | 7/1998 | Pidhirny et al. |
| 5,793,033 A | 8/1998 | Feng et al. |
| 5,811,828 A | 9/1998 | Laser |
| 5,825,006 A | 10/1998 | Longacre, Jr. et al. |
| 5,825,559 A | 10/1998 | Johnson et al. |
| 5,834,754 A | 11/1998 | Feng et al. |
| 5,844,229 A | 12/1998 | Rockstein et al. |
| 5,864,128 A | 1/1999 | Plesko |
| 5,945,658 A | 8/1999 | Salatto, Jr. et al. |
| 5,949,057 A | 9/1999 | Feng |
| 5,969,321 A | 10/1999 | Danielson et al. |
| 5,992,751 A | 11/1999 | Laser |
| 6,060,722 A | 5/2000 | Havens et al. |
| 6,066,857 A | 5/2000 | Fantone et al. |
| 6,073,851 A | 6/2000 | Olmstead et al. |
| 6,098,887 A | 8/2000 | Figarella et al. |
| 6,179,208 B1 | 1/2001 | Feng |
| 6,223,986 B1 | 5/2001 | Bobba et al. |
| 6,223,988 B1 | 5/2001 | Batterman et al. |
| 6,340,114 B1 | 1/2002 | Correa et al. |
| 6,347,163 B2 | 2/2002 | Roustaei |
| 6,431,452 B2 | 8/2002 | Feng |
| 6,445,450 B1 | 9/2002 | Matsumoto |
| 6,449,430 B1 | 9/2002 | Tasaka et al. |
| 6,474,556 B2 | 11/2002 | Dickson et al. |
| 6,527,183 B2 | 3/2003 | Bard et al. |
| 6,607,132 B1 | 8/2003 | Dvorkis et al. |
| 6,636,298 B1 | 10/2003 | Bachelder |
| 6,651,886 B2 | 11/2003 | Krichever et al. |
| 6,651,888 B1 | 11/2003 | Gurevich et al. |
| 6,669,093 B1 | 12/2003 | Meyerson et al. |
| 6,681,994 B1 | 1/2004 | Koenck |
| 6,689,998 B1 | 2/2004 | Bremer |
| 6,712,270 B2 | 3/2004 | Leach et al. |
| 6,729,546 B2 | 5/2004 | Roustaei |
| 6,765,393 B2 | 7/2004 | Pierenkemper et al. |
| 6,805,295 B2 | 10/2004 | Barkan et al. |
| 6,808,114 B1 | 10/2004 | Palestini et al. |
| 6,809,847 B2 | 10/2004 | McQueen |
| 6,827,270 B2 | 12/2004 | Yomogida et al. |
| 6,832,725 B2 | 12/2004 | Gardiner et al. |
| 6,832,729 B1 | 12/2004 | Perry et al. |
| 6,837,433 B2 | 1/2005 | Jam et al. |
| 6,845,915 B2 | 1/2005 | Krichever et al. |
| 6,866,198 B2 | 3/2005 | Patel et al. |
| 6,877,664 B1 | 4/2005 | Oliva et al. |
| 6,891,679 B2 | 5/2005 | Atarashi et al. |
| 6,918,538 B2 | 7/2005 | Breytman et al. |
| 6,974,085 B1 | 12/2005 | Koenck |
| 6,997,385 B2 | 2/2006 | Palestini et al. |
| 7,007,843 B2 | 3/2006 | Poloniewicz |
| 7,025,271 B2 | 4/2006 | Dvorkis et al. |
| 7,025,272 B2 | 4/2006 | Yavid et al. |
| 7,025,273 B2 | 4/2006 | Breytman et al. |
| 7,055,747 B2 | 6/2006 | Havens et al. |
| 7,073,715 B2 | 7/2006 | Patel et al. |
| 7,075,663 B2 | 7/2006 | Canini |
| 7,128,266 B2 | 10/2006 | Zhu et al. |
| 7,147,159 B2 | 12/2006 | Longacre et al. |
| 7,201,318 B2 | 4/2007 | Craen et al. |
| 7,222,793 B2 | 5/2007 | Patel et al. |
| 7,224,540 B2 | 5/2007 | Olmstead et al. |
| 7,264,162 B2 | 9/2007 | Barkan |
| 7,296,749 B2 | 11/2007 | Massieu |
| 7,387,246 B2 | 6/2008 | Palestini et al. |
| 7,395,970 B2 | 7/2008 | Poloniewicz et al. |
| 7,549,582 B1 | 6/2009 | Nunnink |
| 7,604,171 B2 * | 10/2009 | Chang ........................ 235/454 |
| 7,686,223 B2 | 3/2010 | Vinogradov et al. |
| 2002/0014532 A1 | 2/2002 | Yomogida et al. |
| 2002/0034320 A1 | 3/2002 | Mann |
| 2002/0039099 A1 | 4/2002 | Harper |
| 2002/0074403 A1 | 6/2002 | Krichever et al. |
| 2002/0171745 A1 | 11/2002 | Ehrhart |
| 2002/0191309 A1 | 12/2002 | Taylor et al. |
| 2003/0019934 A1 | 1/2003 | Hunter et al. |
| 2003/0020491 A1 | 1/2003 | Pierenkemper et al. |
| 2003/0062413 A1 | 4/2003 | Gardiner et al. |
| 2003/0201327 A1 | 10/2003 | Jam et al. |
| 2003/0205620 A1 | 11/2003 | Byun et al. |
| 2003/0226895 A1 | 12/2003 | Havens et al. |
| 2004/0020990 A1 | 2/2004 | Havens et al. |
| 2004/0159703 A1 | 8/2004 | Kogan et al. |
| 2004/0238637 A1 | 12/2004 | Russell et al. |
| 2005/0035204 A1 | 2/2005 | Knappert et al. |
| 2005/0045725 A1 | 3/2005 | Gurevich et al. |
| 2005/0103851 A1 | 5/2005 | Zhu et al. |
| 2005/0103854 A1 | 5/2005 | Zhu et al. |
| 2005/0103857 A1 | 5/2005 | Zhu et al. |
| 2005/0103858 A1 | 5/2005 | Zhu et al. |
| 2005/0133601 A1 | 6/2005 | Yomogida et al. |
| 2005/0167504 A1 | 8/2005 | Meier et al. |
| 2005/0180037 A1 | 8/2005 | Masterson |
| 2005/0199725 A1 | 9/2005 | Craen et al. |
| 2006/0027659 A1 | 2/2006 | Patel et al. |
| 2006/0034596 A1 | 2/2006 | Yamazaki et al. |
| 2006/0043187 A1 | 3/2006 | He et al. |
| 2006/0043191 A1 | 3/2006 | Patel et al. |
| 2006/0055819 A1 | 3/2006 | Pokrovsky et al. |
| 2006/0060653 A1 | 3/2006 | Wittenberg et al. |
| 2006/0081712 A1 | 4/2006 | Rudeen et al. |
| 2006/0213994 A1 | 9/2006 | Faiz et al. |
| 2007/0057067 A1 | 3/2007 | He |
| 2007/0131770 A1 | 6/2007 | Nunnink |
| 2007/0164115 A1 | 7/2007 | Joseph et al. |
| 2007/0241195 A1 | 10/2007 | Hussey et al. |
| 2008/0277480 A1 | 11/2008 | Thuries et al. |
| 2009/0159684 A1 | 6/2009 | Barber et al. |
| 2009/0166424 A1 | 7/2009 | Gerst et al. |
| 2009/0200380 A1 | 8/2009 | Longacre et al. |

FOREIGN PATENT DOCUMENTS

| | | |
|---|---|---|
| EP | 00755018 | 1/1997 |
| EP | 00957448 | 11/1999 |
| EP | 00574024 | 9/2001 |
| EP | 01308875 | 5/2003 |
| EP | 01519298 | 3/2005 |
| JP | 10134133 | 5/1998 |
| JP | 09128471 | 5/2006 |
| WO | WO-9603708 | 2/1996 |
| WO | WO-9816896 | 4/1998 |
| WO | WO-0016241 | 3/2000 |
| WO | WO-03062956 | 7/2003 |
| WO | WO-03063064 | 7/2003 |
| WO | WO-2005041111 | 5/2005 |
| WO | WO-2005050390 | 6/2005 |
| WO | WO-2005073895 | 8/2005 |
| WO | WO-2006/004858 | 1/2006 |
| WO | WO-2006/026239 | 3/2006 |
| WO | 2008076399 A2 | 6/2008 |

OTHER PUBLICATIONS

Cognex Corporation, Cognex Expands Reading Capability, Press Release, Natick, MA, Date Oct. 9, 2007.

Cognex Corporation, DataMan 100 SHD/C-Mount Kit Removal Instructions, 590-7042, 2007.

* cited by examiner

PRIOR ART

MODULAR FOCUS SYSTEM FOR IMAGE BASED CODE READERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates to machine vision systems, and more particularly, to a modular focus system that enables an image-based ID, or code, reader to be operated as a manual focus reader and as a variable focus reader.

Machine vision systems use image acquisition devices such as cameras to capture images of various objects. These images are processed according to any number of decoding algorithms to obtain information about each of the imaged objects. Various identification and/or decision-making functions, such as for parts inspection, inventory, quality control, and the like, are made based on the obtained information.

An image-based code reader is a type of machine vision system. Images acquired for code reading, also known as direct part mark ("DPM") or label-based identification, include one or more 1D (i.e., a barcode) or 2D s (i.e., a Data Matrix code) symbols located on an object. The code reading process includes repeatedly introducing an object marked with either 1D or 2D codes within a field of view of an image acquisition sensor (e.g., CMOS camera, CCD, etc.), illuminating the codes, and acquiring images, i.e., image data, containing the codes. Each code contains a set of predetermined patterns from which an attached data processor, such as a computer, can derive useful information about the object (e.g., serial number, type, model, price, etc.).

The image data acquired by the code reader, however, must be sufficiently focused for effective and repeatable processing. To this end, image-based code readers may be constructed as fixed focus, manual focus, and/or variable focus readers. Regardless of the reader type, a decodable image is obtained when the image data is sufficiently focused onto an image acquisition sensor arranged within a focal plane of the reader.

Fixed focus code readers have a lens that is not adjustable and therefore, are the most basic type of image-based code reader. The lens is fixed in place relative to an image sensor after undergoing a factory focus process to account for the variations of each lens. When installed, the target distance, i.e., the distance from the lens to the target object is dictated by the focal length of the reader. Understandably, fixed focus readers are very useful when the target distance is relatively constant or low resolution image data is acceptable. However, they become much less suitable when the target distance varies, such as with different-sized target objects, resulting in degraded images that cannot be reliably decoded. Although a fixed focus code reader may be repositioned to obtain a focused image or multiple readers may be installed at different target distances, neither solution is particularly desirable due to the increased complexity and associated costs.

Figure 5:
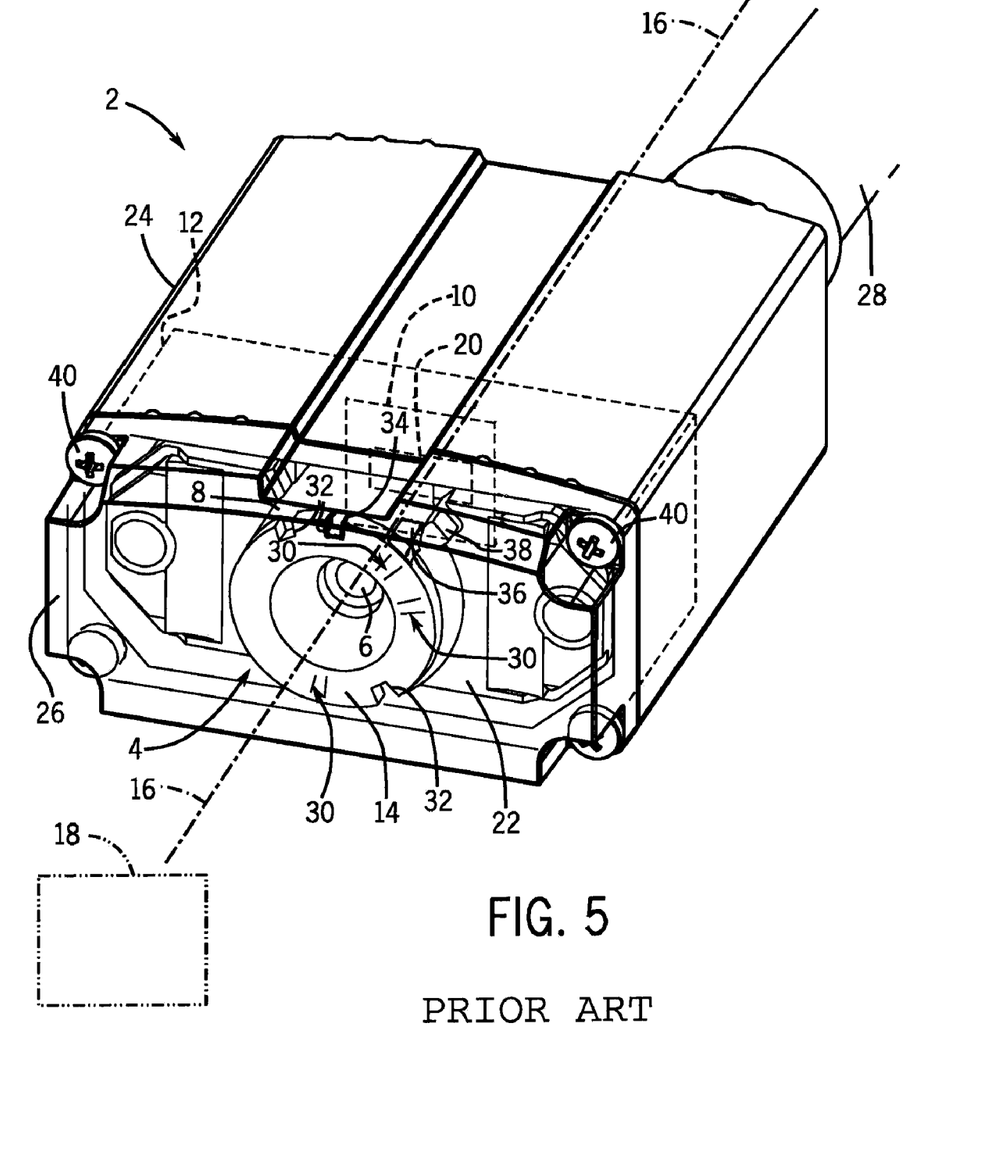
FIG. 5, already described, is a perspective view of a fixed-mount, image-based code reader with a manual focus system according to the background art.

Manual focus code readers overcome some of the drawbacks of fixed focus code readers. Manual focus code readers are similar to fixed focus readers but provide a limited ability to focus the reader by adjusting the lens instead of moving the reader. By way of background, a commercially available fixed-mount, image-based code reader 2 is illustrated in FIG. 5. The code reader 2 has an optical assembly 4 including a lens 6 fixedly mounted within a lens barrel 8. The lens 6 focuses image data, i.e., reflected light from an image, onto an image plane 10 and an image sensor 20 aligned with the plane 10. The reader 2 includes hardware (not shown) encoded with software that is configured to, among other things, control illumination, acquire image data, and process/decode the acquired image data into usable information.

The code reader 2 further includes a lens mount assembly 12 that supports the lens barrel 8 and a focus ring 14 for manually setting the focus position of the code reader 2. These components are assembled about an optical axis 16 extending between a target object 18 (I.e., object to be imaged) and the image sensor 20. The sensor 20 is positioned about the intersection of the optical axis 16 and the image plane 10 such that the image data is focused by the lens 6 onto the sensor 20.

A distal end of the lens barrel 8 is secured via a threaded connection with a receptacle 22 formed within the lens mount assembly 12. A proximal end of the lens barrel 8 has the focus ring 14 fixedly secured thereto. Because of the threaded connection, manual rotation of the focus ring 14 drives the lens barrel 8 further into or out of the receptacle 22. This rotation is translated into an axial movement between the lens 6 and the image sensor 20.

The lens mount assembly 12 is secured within a housing 24 and covered by a clear lens cover 26 to protect the optical and hardware components from environmental conditions such as dust and moisture. The cover 26 and a sealing gasket (not shown) are secured to the housing 24 with screws 40. A cable 28 provides a communication link between the code reader 2 and another device, e.g., a host computer running a database application. The computer may generate a trigger signal for the code reader 102 and receive image data. The cable 28 also supplies power to the code reader 2.

The manual focus code reader 2 is designed to be operated in one of a number of predetermined focus positions, each having a unique focal length and corresponding code reading distance range. Each focus position is indicated with an appropriate marking 30 (e.g., "40", "65", and "105") on the focus ring 14, indicating the optimal reading distances, in millimeters, set by the manufacturer. Each focus position has an corresponding slot 32 formed in the periphery of the focus ring 14. The slots 32 are spaced about the focus ring 14 and receive a locking tab 34 formed in the lens cover 26. The angular position of each slot 32 is determined by the corresponding predetermined focal length, i.e., the axial distance between the lens 6 and the image sensor 20.

The focus ring 14 further includes a mechanical stop 36 to prevent the lens 6 from being rotated more than one complete revolution. The stop 36 is formed as a protrusion in the focus ring 14 that presses against a focus selector tab 38 when the focus ring 14 is at either end of the focusing range. The stop 36 limits axial movement of the lens 6 relative to the image sensor 20 to just less than one full rotation of the lens barrel 8.

To set the focus position of the reader 2, the focus ring 14 is manually adjusted to align a desired focus position setting 30 with the focus position selector tab 38. The locking tab 34 prevents the lens barrel 8 from rotating when the cover 26 is on, thus 'locking' the lens 6 into one of the pre-established focus positions. The cover 26 can only be secured to the housing 24 when the pin 34 is aligned with and received by one of the focus position slots 32.

Although manual focus code readers 2 provide some focusing flexibility as discussed above, changing the focus position of a code reader 2 is an involved and time consuming process. Further, the proper tools are needed to change the focus position of such a code reader 2. Still further, the lens 6 and other internal components are potentially exposed to environmental conditions including dust, dirt, water, chemicals, and the like while the lens cover 26 is removed.

Variable focus code readers overcome many of the drawbacks of manual and fixed focus code readers. As used herein, the term "variable focus code reader" refers to code readers with an electrically controllable focus system and may be part of an autofocus system. Existing variable focus code readers have very small electromechanical components such as stepper or piezo-motors that move the lens with respect to the image sensor. However, these readers have a number of expensive electromechanical components, are prone to breakage, and have only a limited number of cycles. Further, conventional variable focus code readers may not have the required optical tolerances due to friction between the lens components, may consume a large amount of power, and have a low operating speed. As such, no known code readers have a modular focus system with interchangeable lens attachments such that a single code reader to be operated as a fixed focus, manual focus, or variable focus reader depending on which lens attachment is secured to the reader without the aforementioned drawbacks.

It is therefore desirable to have a focus system for a machine vision component, such as the code reader 2, that combines the aforementioned focusing systems and overcomes the aforementioned drawbacks. It is further desirable to have a fixed or manual focus code reader that can easily be transformed into a variable focus code reader with the addition of a variable focus "add-on" or "accessory option" lens attachment. It is still further desirable to have a compact modular variable focus system with no moving parts and that does not expose the interior of the housing to the surrounding environment.

SUMMARY

In one embodiment, an image-based code reader includes a lens mount secured within a housing, a lens barrel rotatably received within the lens mount, a sensor for capturing image data reflected from a target object, an imager lens assembly secured within the lens barrel that focuses the image data onto the sensor, and a modular focusing system. The modular focusing system includes a first removable lens attachment having a focus ring disposed at a target-facing end and a retaining flange disposed at a sensor-facing end. When coupled to the lens barrel, the first lens attachment is rotated to focus the code reader. The modular focusing system may include a second removable lens attachment having a liquid lens mounted within a housing and a pair of electrodes in electrical contact with the liquid lens. When the second lens attachment is coupled to the lens barrel, electrical power is supplied to the liquid lens via the electrodes to focus of the code reader.

In another embodiment, a modular focus system for an image-based code reader includes a lens mount having a receptacle, a lens barrel at least partially disposed within the receptacle, an imager lens secured about an optical axis within the lens barrel for converging rays of reflected light from an object onto a sensor, and a plurality of removable lens attachments for adjusting the focus of the reader. The plurality of lens attachments include a manual focus lens attachment, able to be secured to the lens barrel such that rotation of the manual focus lens attachment translates into an axial movement of the imager lens with respect to the sensor, and a variable focus lens module, able to be secured to the lens barrel such that a liquid lens disposed therein is electrically connected to the code reader.

In yet another embodiment, a removable variable focus lens module for an image based code reader includes a housing having a base and a cover defining a cavity and an opening extending through the housing about a module axis, a first electrical contact disposed within the cavity having at least one electrode extending therefrom generally parallel to the module axis, a liquid lens element, a ring configured to center the liquid lens element about the module axis, a second electrical contact positioned in the cavity such that the first and second electrical contacts sandwich the liquid lens element, and a biasing element disposed between one of the first and second electrical contacts and one of the base and cover to hold the first and second contacts in electrical and mechanical contact with the liquid lens element. The variable focus lens module is able to be secured to the code reader such that the module axis generally aligns with an optical axis of the code reader.

DETAILED DESCRIPTION OF THE PREFERRED EMBODIMENT

Figure 1:
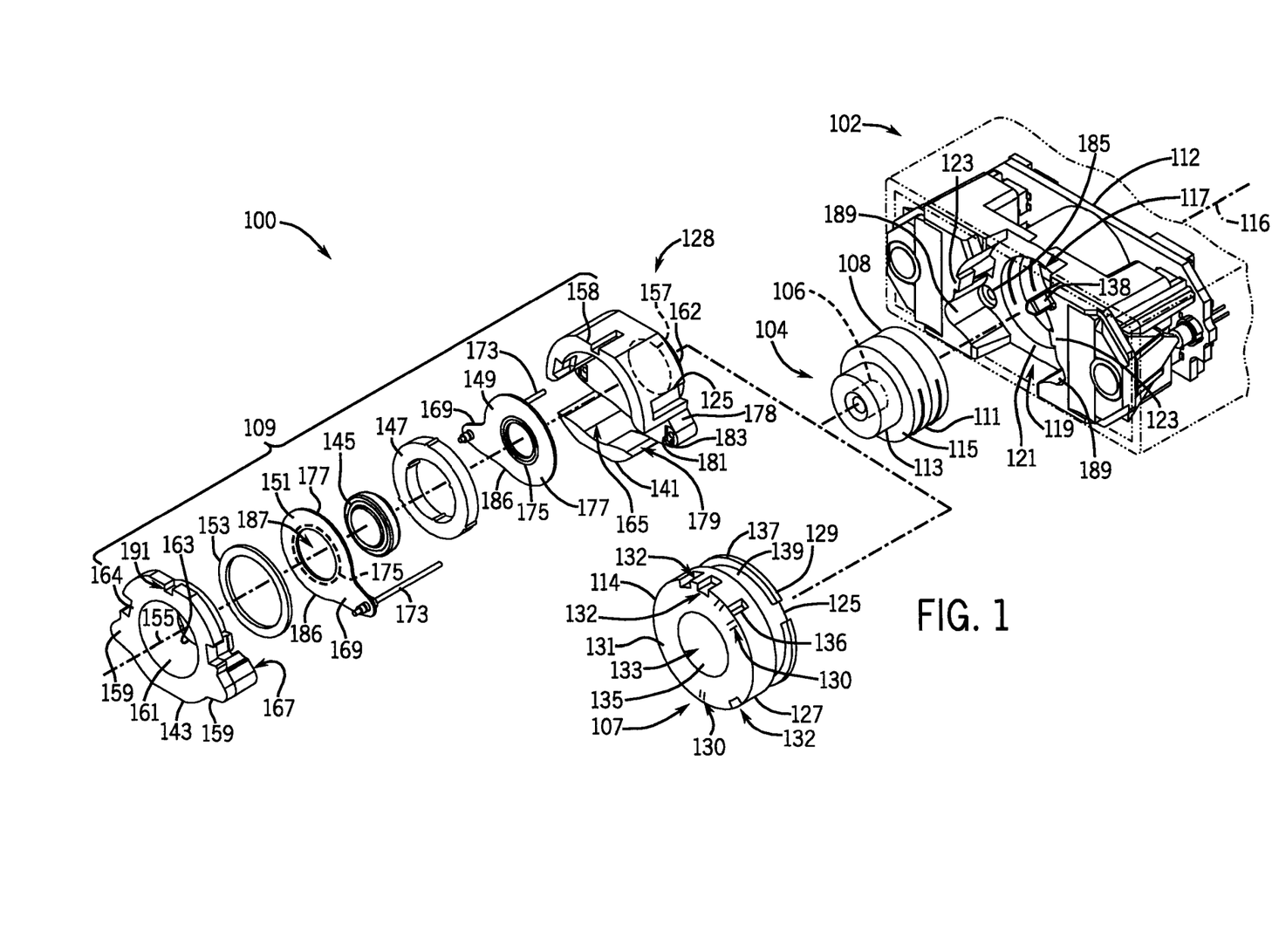
FIG. 1 is a partially exploded perspective view of a first embodiment of a modular focus system for an image-based code reader in accordance with an aspect of the present invention.

A first embodiment of a modular focus system 100 for an image-based code reader 102 is illustrated in FIG. 1. The modular focus system 100 includes an optics assembly 104 having an imager lens assembly, or lens, 106 fixedly secured within a lens barrel 108 and arranged about an optical axis 116. The modular focus system 100 further includes a number of removable, or 'swappable', lens attachments, each configured to be releasably secured to the code reader 102 depending on the requirements of each imaging application.

A first illustrated swappable lens attachment is a manual focus lens cap 107 having a barrel-shaped housing 127 with an integrally formed focus ring 114. The manual focus lens cap 107 allows for manual focus adjustments of the code reader 102. A second illustrated swappable lens attachment is a variable focus lens cap 109 having a generally cylindrical-shaped housing 128 with a liquid lens element 145 disposed therein. Not illustrated are other contemplated swappable lens attachments, including but not limited to telephoto lenses and filters, considered within the scope of this invention.

The lens barrel 108 includes a cylindrical base 111, a radially smaller lens attachment mount 113, and an annular shoulder 115 extending between the base 111 and the mount 113. The lens barrel 108 is secured to the code reader 102 via a lens mount assembly 112. The lens mount assembly 112 includes a cylindrical bore 117, an adjacent lens attachment receptacle 119, and an bore shoulder 121 formed at the juncture of the bore 117 and the receptacle 119.

The lens barrel 108 is rotatably coupled to the lens mount assembly 112 via a threaded connection between the lens barrel base 111 and the bore 117. When the base 111 is fully received within the bore 117, the lens barrel shoulder 115 and the bore shoulder 121 are in close proximity with each other. The lens attachment mount 113 axially extends into the lens attachment receptacle 119 and is adapted to receive either of the swappable lens attachments 107, 109 when placed therein. The lens mount assembly 112 further includes angularly opposed key tabs 123 radially extending into the receptacle 119 and semicircular cutouts 189 radially extending outward from the receptacle 119.

As further explained below, the key tabs 123 and cutouts 189 correspond to slots 125 and protrusions 159 formed in the housings 127, 128 of the lens attachments 107, 109 such that the lens attachments can only be coupled and decoupled to the lens barrel 108 at one predetermined angular position of the imager lens 106. Thus, when a lens attachment 107, 109 is swapped out, the focal length, i.e., the distance between the lens 106 and the image sensor (not shown), is always the same as when the lens was factory focused. If the focal distance of the reader 102 was not fixed when swapping out attachments 107, 109, the focus position indicia 130 would not be correct nor would any software-based focusing applications.

Still referring to FIG. 1, the housing 127 of the manual focus lens cap 107 includes an axially inner and outer face 129, 131 and radially inner and outer cylindrical walls 135, 139 extending therebetween. The focus ring 114 is integrally formed and constitutes the outer face 131. As with the conventional focus ring 14, the integral focus ring 114 includes a number of indicia 130 and associated slots 132 representing the pre-established focus positions and a mechanical stop 136. An annular flange 137 having a pair of the aforementioned alignment slots 125 formed therein is disposed adjacent to the inner face 129. An axial opening 133 is defined by the inner cylindrical wall 135 and extends fully between the inner face 129 and the outer face 129, 131.

The manual focus lens cap 107 is coupled to the code reader 102 by aligning the slots 125 with the key tabs 123 on the lens mount 112 and urging the lens cap 107 into the receptacle 119. As the lens cap 107 is received into the receptacle 119, the inner housing wall 135 frictionally engages the lens attachment mount 113. The lens cap 107 is urged further into the receptacle 119 until the inner face 129 abuts the lens barrel shoulder 115. The lens cap 107 is affixed to the lens barrel 108 via a friction fit between the inner housing wall 135 and the lens attachment mount 113 or other mechanical retaining means such as a snap fit.

When coupled together, rotation of the lens cap 107 via the integral focus ring 114 causes the lens barrel 108 to rotate. Because of the threaded connection, radial movement of the lens barrel 108 translates into axial displacement of the lens 106 with respect to the image sensor. In this manner, the reader 102 is focused by positioning the focus ring 114 such that one of the focus position indicia 130 is aligned with a focus selector tab 138 on the lens mount 112, thus operating at a pre-established focal length.

The keyed arrangement between the manual focus lens cap 107 and the receptacle 119 ensures that the lens cap 107 is placed onto and removed from the code reader 102 at a known focus, or angular, position. The position of the lens cap 107 when mounted to or removed from the code reader 102 corresponds to an established distance between the lens assembly 106 and the image sensor. The flange 137 prevents the lens cap 107 from being removed from the lens barrel 108 except when the slots 125 are aligned with the key tabs 123. Thus, the distance between the lens 106 and the image sensor remains constant regardless of the number of times a lens attachment is removed and replaced with another one.

Still referring to FIG. 1, the housing 128 of the variable focus lens cap 109 includes a bowl-shaped base piece 141 having axially extending side walls 158 and a cover 143 having a cylindrical inner wall 161. The housing 128 includes an axially inner and outer face 162, 164 and defines a generally cylindrical receiving space 165. Within the receiving space 165, the liquid lens 145, secured within a spacer ring 147, and is axially disposed between an inner and outer ring-shaped electrical contacts 149, 151. A biasing member, such as a compressible ring 153, maintains mechanical contact between the liquid lens 145 and the contacts 149, 151. The base 141 and cover 143 are preferably bonded together with an appropriate fastening means.

Both the base and cover pieces 141, 143 have coaxial openings 157, 163 centered about a module axis 155. The liquid lens 145, contacts 149, 151, and compressible ring 153 are also centered about the module axis 155 so as to form a pathway for image data to pass through the variable focus lens attachment 109. When the variable focus lens attachment 109 is placed on the code reader, image data further passes through the lens barrel 108 and lens 106, until reaching the image sensor.

The cover piece 143 includes the aforementioned projections 159, each defining an alcove 167. Each contact 149, 151 includes a ring-shaped body portion 186 and a tabbed extension 169 with an axially extending metal pin, i.e., electrode 173, received within respective alcoves 167 of the cover 143. The electrodes 173 are mechanically coupled to the contacts 149, 151 with an appropriate fastener such as solder, a metal washer and nut, and the like.

The base piece 141 includes extensions 178 with an indented portion 181 and a hole 183 to receive the respective electrodes 173. Corresponding cutouts 179 are formed in the side walls 158 to accommodate the projections 159 in the cover 143. The cutouts 179 and holes 183 align the contacts 149, 151 and pins 173 with power and ground receptacles 185 disposed in the lens mount assembly 112.

The ring-shaped contacts 149, 151 are formed from a non-conducting substrate, such as used in printed circuit boards, although other appropriate shapes and materials may be used. The contacts 149, 151 include a ring-shaped trace 175 of conductive material, preferably copper, applied to a liquid lens-facing surface 177. The trace 175 is electrically connected to the electrode 173 and extends between the tabbed extension 169 and the body 186. When the variable focus lens cap 109 is placed on the code reader 102, the electrodes 173 are electrically connected to a voltage source via the receptacles 185. As such, a conductive path is provided between the code reader 102 and the liquid lens element 145 via the electrodes 173 and traces 175. The biasing force applied to the contacts 149, 151 and liquid lens element 145 by the compressible ring 153 ensures constant electrical contact between the conductive traces 175 and the liquid lens element 145.

The liquid lens element 145 enables very quick and precise focusing of the code reader 102 without mechanical components. The liquid lens 145 is electrically controlled, i.e., manipulated, with an electrowetting-based technique in order to focus image data passing through the lens attachment 109 prior to reaching the code reader 102. Preferably, the liquid lens 145 contains two immiscible fluids: a conducting fluid and an insulating fluid, such as water and oil, respectively. One of the contacts 149, 151 charges the conducting fluid with reference to the other contact 149, 151 that is isolated from the conducting fluid by an insulator and a hydrophobic coating. The shape of the interface between the conductive fluid and the insulating fluid is affected proportionately to the applied voltage. In this way, the focal length of the lens 106, and thus the focus of the reader 102 is controlled by software running in the controller of the code reader 102.

Suitable liquid lens elements 145 include the FluidFocus™ variable focus lens available from the Philips Corporation and the Varioptic electrowetting variable focus lens assembly available from Varioptic SA of Lyon, France. Commonly assigned U.S. patent application Ser. No. 11/304,409, entitled SELECTABLE FOCUS DIRECT PART MARK READER, by Laurens W. Nunnink, the teachings of which are expressly incorporated herein by reference, teaches the structure and operation of a liquid lens element within a direct part mark code reader.

Like the manual focus lens cap 107, the variable focus lens cap 109 is coupled to the code reader 102 by aligning the key slots 125 with the key tabs 123 and urging the lens cap 109 into the receptacle 119. As the lens cap 109 is received into the receptacle 119, the coaxial opening 157 in the base piece 141 receives the lens attachment mount 113. The pins 173 and extensions 178 are received within the receptacles 185 and cutouts 189, respectively. The lens cap 109 is pressed into the receptacle 119 until the inner face 162 abuts the lens barrel shoulder 115. The variable focus lens cap 109 is retained to the lens barrel 108 via friction between the mount 113 and the axial opening 157 of the base piece 141 and between the electrodes 173 and the corresponding receptacles 185. A slot 191 is provided in the cover 143 and arranged to interface with a locking tab 32 (FIG. 5) in the lens cover 26 to further secure the lens attachment 109 to the code reader 102.

Although not illustrated, the code reader 102 includes a processor with encoded software applications by which illumination can be provided, the liquid lens element 145 can be controlled, and images can be acquired, processed, and decoded into usable information. In one embodiment, the presence of the variable focus lens module 109 is detected by measurement of the impedance and/or capacitance of the liquid lens 145 and the code reader 102 is operated in a variable focus mode. When the module 109 is no longer detected, the code reader 102 resumes manual focus operation.

The variable focus lens cap 109 may be used in combination with a target range finder or focusing algorithm, to operate in an autofocus mode. In such a mode, the optimum focus setting for each target may be extrapolated by the code reader 102 based on the clarity of a preceding image of the same object. Commonly assigned U.S. Pat. No. 6,636,298, entitled METHOD AND APPARATUS FOR FOCUSING AN OPTICAL INSPECTION SYSTEM, to Bachelder, et al., the teachings of which are expressly incorporated herein by reference, teaches a method for determining an optimal focus setting of an optical imaging system. Alternatively, a range finder, infrared sensor, aiming illuminations, or other known method may be used to compute the distance between the code reader 102 and the object 18 and adjust the liquid lens 145 accordingly. Based on the determined focus setting, the code reader 102 applies a corresponding voltage across the liquid lens element 145 via the electrodes 149, 151. The liquid lens element 145 is thus able provide sharp and clear images without the need for human intervention. Alternatively, the liquid lens 145 may be adjusted by an operator command.

Figure 2:
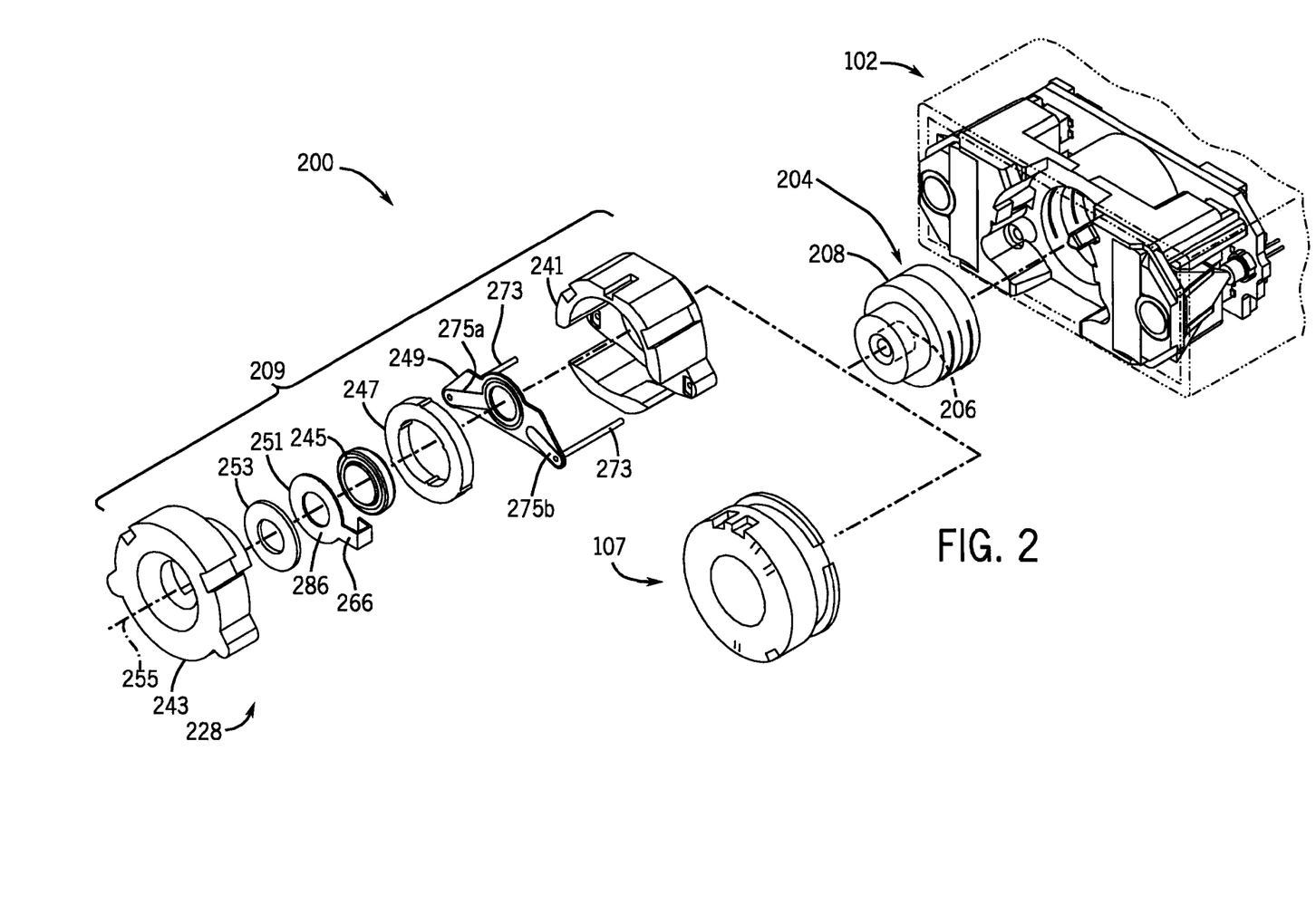
FIG. 2 is a partially exploded perspective view of a second embodiment of a modular focus system in accordance with another aspect of the present invention.

Referring now to FIG. 2, a second embodiment of a modular focus system 200 for the image-based code reader 102 is shown. The modular focus system 200 includes an optics assembly 204 having a lens 206 fixedly secured within a lens barrel 208, and two illustrated removable lens attachments, i.e., previously described manual focus lens cap 107 and a variable focus lens cap 209 having modified contacts 249, 251.

As with the modular focus system 100 of FIG. 1, the variable focus lens cap 209 has a housing 229 including a base 241 and a cover 243. The lens cap 209 further includes a liquid lens element 245 retained within a spacer ring 247, the contacts 249, 251 sandwiching the liquid lens 245, and an elastic ring 253. The contacts 249, 251, liquid lens 245, and elastic ring 253 are assembled together within the housing 229 about a module axis 255.

The inner contact 249 includes both electrodes 273, each having a separate tracing 275a, 275b. The outer contact 251 is formed entirely of a conducting material and includes a body 285 with an axially extending contact arm 266. The contacts 249, 251 are assembled on respective sides of the liquid lens 245, such that one tracing 275a is in direct contact with an axially-facing surface of the liquid lens 245 while the other tracing 275b is electrically connected to the opposite surface of the liquid lens 245 via the arm 266 and body 286 of the outer contact 251. Functionally, the modular focus system 200, including the two illustrated lens attachments 107, 209, operates in the same manner as the focus system 100 of FIG. 1.

Figure 3:
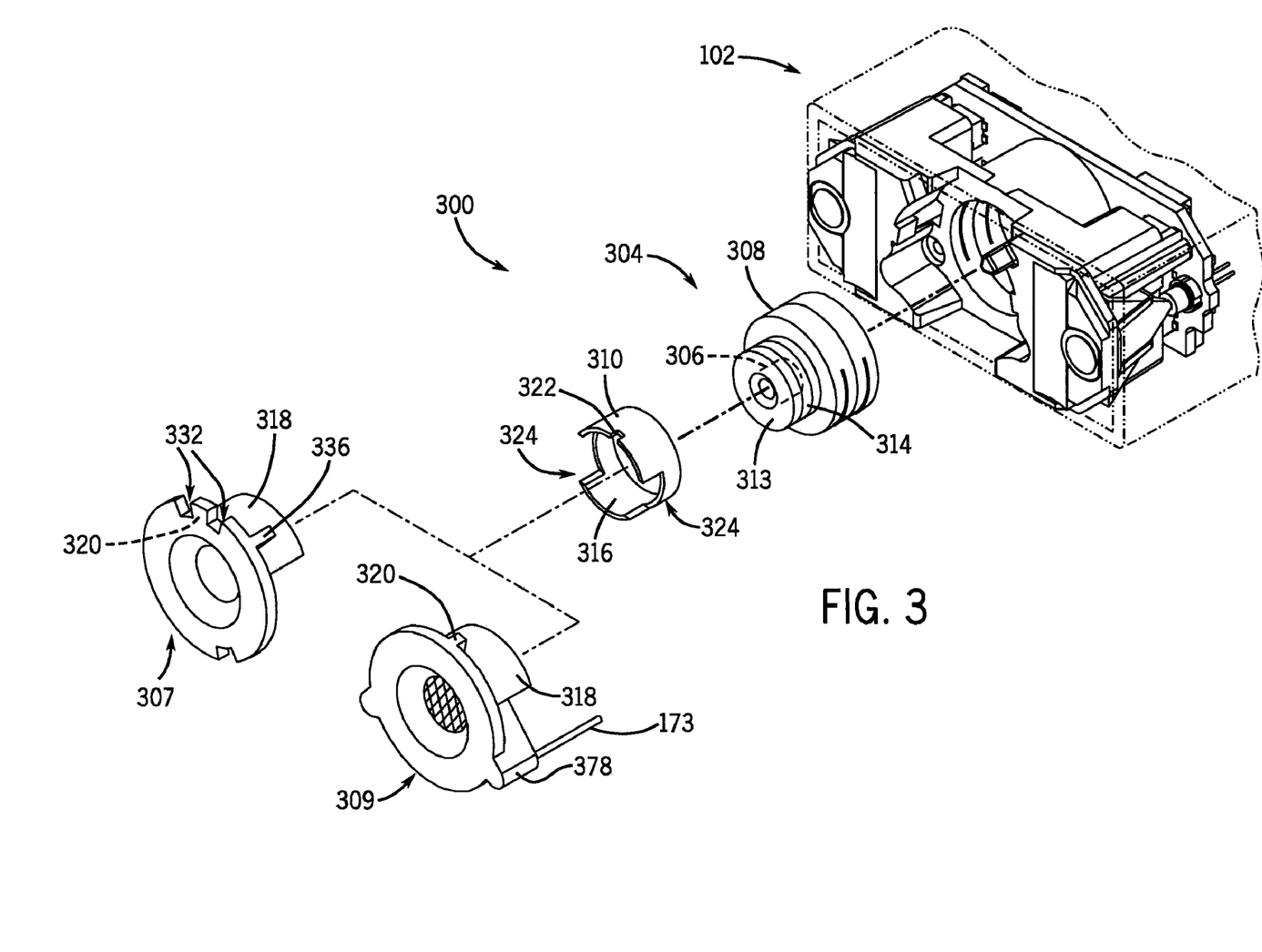
FIG. 3 is a partially exploded perspective view of a third embodiment of a modular focus system in accordance with another aspect of the present invention.

Referring now to FIG. 3, a third embodiment of a modular focus system 300 for the image-based code reader 102 is shown. The modular focus system 300 includes an optics assembly 304 having a lens 306 fixedly secured within a lens barrel 308. The modular focus system 300 further includes a number of removable lens attachments, i.e., a manual focus lens cap 307 for manual focus and a variable focus lens cap 309 for variable focus operation. Unlike the embodiments shown in FIGS. 1 and 2, the third focus system 300 includes an intermediate coupling ring 310 fixedly secured to a lens attachment mount 313 on the lens barrel 308. The coupling ring 310 is configured to receive either lens attachment 307, 309.

The coupling ring 310 may be affixed to the lens barrel 306 with a press fit between angled ribs 314 on the mount 313 and the inner surface 316 of the coupling ring 310. The manual focus lens cap 307 and the variable focus lens cap 309 each have mating extensions 318 are securely engaged by the inner surface 316 of the coupling ring 310 via a friction fit. Both lens attachments 307, 309 have an alignment tab 320 adapted to interface with an alignment notch 322 in the coupling ring 310 so as to ensure proper angular positioning when attached to the code reader 102. The coupling ring 310 further includes a pair of cutouts 324 to accommodate electrode extensions 378 in the variable focus lens cap 309. The manual focus cap 307 further includes a mechanical stop 336 to limit focus adjustment to less than one full rotation.

Figure 4:
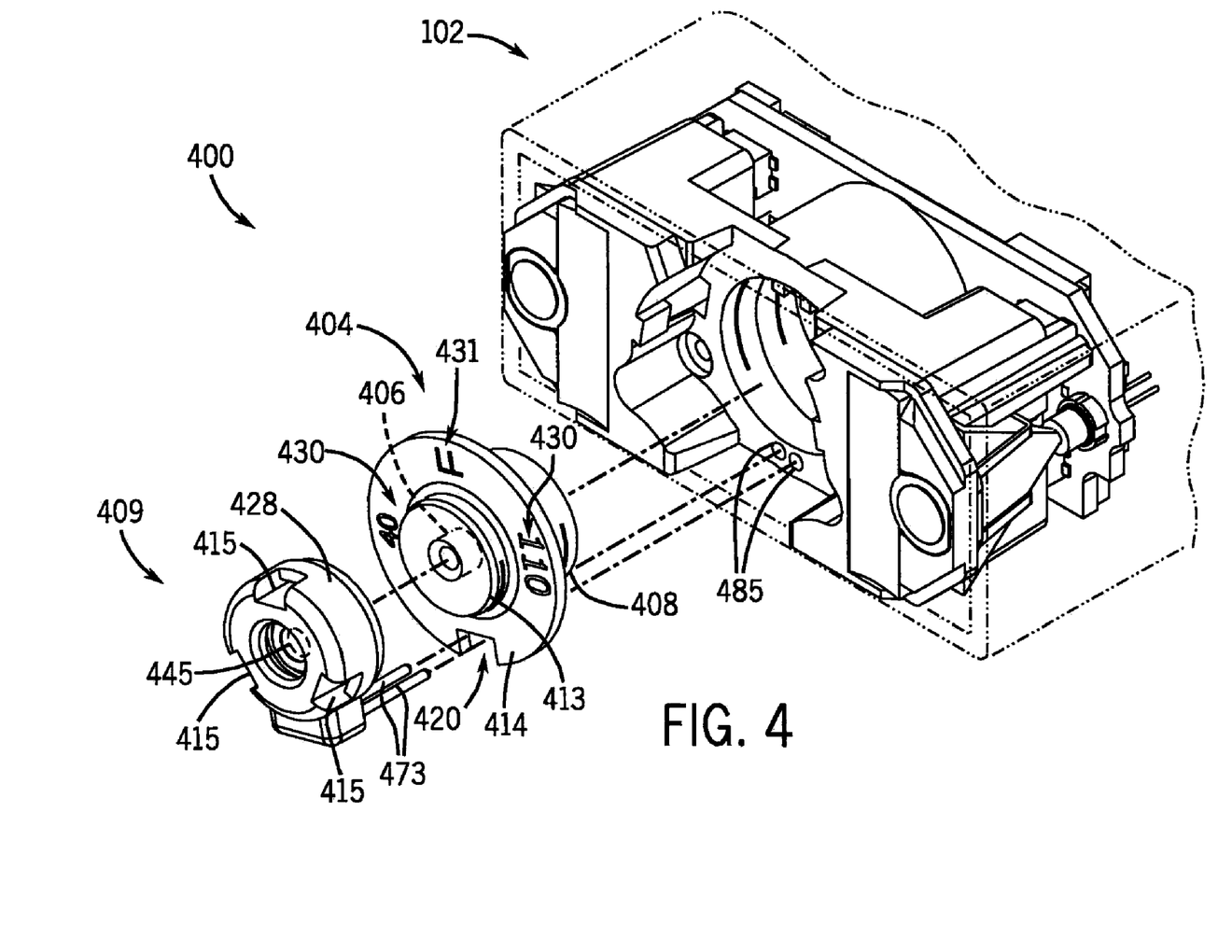
FIG. 4 is a partially exploded perspective view of a fourth embodiment of a modular focus system in accordance with another aspect of the present invention.

Referring now to FIG. 4, a fourth embodiment of a modular focus system 400 for the image-based code reader 102 is shown. The modular focus system 400 includes an optics assembly 404 having a lens 406 fixedly secured within a lens barrel 408. The focus system 400 includes a removable variable focus lens cap 409 having a liquid lens element 445 fixedly secured within a barrel-shaped housing 428. The housing 428 is formed of molded plastic and includes finger grips 415 to assist when placing the lens cap 409 on the code reader lens barrel 408.

A focus ring 414 is fixedly secured to the lens barrel 408 after the reader 102 has been factory focused. Without the variable focus lens cap 409, the reader 402 may operate in a manual focus mode, limited to one of the enumerated focus positions 430 of the lens 406. The illustrated focus ring 414 has two enumerated focal length positions 430 (i.e., '40' and '110') corresponding to two pre established preset reading distance ranges, in millimeters, used by the software application for various decoding algorithms.

The focus ring 414 also has a third, variable focus, position 431, (i.e., 'LL'), corresponding to a third preset focus position. A cutout 420 is provided in the focus ring 414 radially opposite from the variable focus position 418. To select the variable focus mode, the cutout 420 is axially aligned with a pair of receptacles 485 in a lens mount assembly 412. The receptacles 485 are configured to receive axially extending electrodes 473 of the variable focus lens module 409. The code reader 402 can only receive the variable focus lens cap 409 when the cutout 420 is aligned with the receptacles 485. The variable focus lens module 409 is coupled to the lens barrel 408 via a press or snap fit between the lens barrel mount 413.

Certain aspects of the present invention, therefore provide an interchangeable focus system for an image-based code reader via swappable lens attachments providing manual and variable focus mode operation. As illustrated and described above, the various focus systems have a variety of shapes and retaining methods. However, the modular focus system of the present invention is not limited to the above illustrated embodiments. Rather, the invention covers all modifications, equivalents, and alternatives falling within the spirit and scope of the invention as defined by the following appended claims.

The image-based code readers constructed in accordance with one or more aspects of the present invention are less expensive, as a basic code reader device can be turned to be a variable focus device with the addition of readily available accessories), and easier as sales only need one device which can easily be expanded or reduced by the modular swappable components.

The invention claimed is:

1. An image-based code reader comprising:
   a lens mount secured within a lens mount housing;
   a lens barrel rotatably received by the lens mount;
   a sensor for capturing image data reflected from a target object;
   an imager lens assembly fixedly secured within the lens barrel about an optical axis, wherein the imager lens assembly focuses the image data onto the sensor; and
   a modular focusing system including a first removable lens attachment having a focus ring disposed at a target-facing end and a flange disposed at a sensor-facing end and a second removable lens attachment comprising:
   a liquid lens secured within a liquid lens housing; and
   a pair of electrodes in electrical contact with the liquid lens;
   wherein the code reader is focused by at least one of adjusting the first lens attachment when secured to the code reader or a voltage to the liquid lens when the second lens attachment is coupled to the lens barrel.

2. The image based code reader of claim 1, wherein when the first lens attachment is rotated, the imager lens assembly is axially displaced from the sensor to focus the code reader.

3. The image based code reader of claim 2, further including a cover comprising a locking tab, wherein the locking tab is configured to be received within a slot in the first lens attachment when connected to the lens mount housing so as to prevent rotation of the first lens attachment.

4. The image based code reader of claim 2, wherein the lens mount includes at least one aligning tab, wherein the first lens attachment includes at least one key slot aligned with at least one aligning tab when the first lens attachment is placed onto and removed from the lens barrel, and wherein the at least one aligning tab corresponds to a predetermined focal length of the imager lens.

5. The image based code reader of claim 4, wherein the at least one aligning tab is formed in a receptacle disposed in the lens mount and the at least one key slot is formed in the retaining flange.

6. The image based code reader of claim 1, wherein the liquid lens housing includes at least one key slot aligned with the at least one aligning tab when placed onto and removed from the lens barrel, and wherein the at least one aligning tab corresponds to a predetermined focal length of the imager lens assembly.

7. The image based code reader of claim 1, further comprising a controller configured to detect when the second removable lens attachment is coupled to the code reader.

8. The image based code reader of claim 7, further comprising a controller configured to detect at least one of out-of-focus image data, a target distance, and an operator input; wherein the controller is further configured to generate an output voltage for the liquid lens when one of out-of-focus image data, a target distance, and an operator input is detected.

9. A modular focus system for an image-based code reader, the system comprising:
   a lens mount;
   a lens barrel received by the lens mount;
   an imager lens secured about an optical axis within the lens barrel for converging reflected image data from an object onto a sensor; and
   a plurality of removable lens attachments for adjusting the focus of the reader, the plurality of lens attachments including:
   a manual focus lens module configured to be secured to the lens barrel such that rotation of the manual focus lens module translates into an axial movement of the imager lens relative to the sensor; and
   a variable focus lens module configured to be secured to the lens barrel and electrically connected to a controller such that an output from the controller adjusts the focus of the code reader.

10. The modular focus system of claim 9, wherein the manual focus lens module is comprised of:
    a focus ring disposed at a target-facing end; and
    a retaining flange disposed at a sensor-facing end.

11. The modular focus system of claim 10, wherein the manual focus lens module is further comprised of a mechanical stop for limiting rotation of the lens barrel to a predetermined range.

12. The modular focus system of claim 9, wherein the variable focus lens module is comprised of:
    a liquid lens disposed within a housing; and
    a pair of electrodes in electrical contact with the liquid lens.

13. The modular focus system of claim 12, wherein the variable focus lens module is further comprised of a biasing member for holding the liquid lens and electrodes together within the housing.

14. The modular focus system of claim 9, wherein the lens mount includes at least one inwardly extending aligning tab, and wherein each of the plurality of lens attachments includes at least one associated key slot such that each of the at least one aligning tabs and associated key slots are aligned to couple and decouple the lens attachments to the code reader.

15. The modular focus system of claim 14, wherein the lens mount further includes a cutout for receiving an extension formed in the variable focus lens module.

16. A removable variable focus lens module for an image based code reader, the variable focus lens module comprising:
- a housing having a base and a cover, the base and cover defining a cavity and an opening extending through the housing about a module axis;
- a first electrical contact disposed within the cavity having at least one electrode extending therefrom generally parallel to the module axis;
- a liquid lens element;
- a spacer configured to center the liquid lens element about the module axis;
- a second electrical contact positioned in the cavity such that the first and second electrical contacts sandwich the liquid lens element; and
- a biasing element disposed between one of the first and second electrical contacts and one of the base and cover to hold the first and second contacts in electrical and mechanical contact with the liquid lens element;
- wherein the variable focus lens module is configured to be removably secured to the code reader such that the module axis generally aligns with an optical axis of the code reader.

17. The removable variable focus lens module of claim 16, wherein the housing further includes a key slot such that the key slot is aligned with a corresponding aligning tab formed in the code reader when the variable focus lens module is secured to or removed from the code reader.

18. An image-based code reader comprising:
- a lens mount secured within a lens mount housing;
- a lens barrel received by the lens mount;
- a sensor for capturing image data reflected from a target object;
- an imager lens assembly fixedly secured within the lens barrel about an optical axis, wherein the imager lens assembly focuses the image data onto the sensor; and
- a modular focusing system including a first removable lens attachment having a focus ring and a second removable lens attachment comprising:
  - a variable focus element adapted to be secured to an element housing; and
  - a pair of electrodes in electrical communication with the variable focus element;
- wherein the code reader is focused by at least one of adjusting the first lens attachment when secured to the code reader or supplying a voltage to the variable focus element when the second lens attachment is coupled to the lens barrel.

19. The image-based code reader of claim 18, wherein when the first lens attachment is rotated, the imager lens assembly is axially displaced from the sensor to focus the code reader.

20. The image-based code reader of claim 19, further including a cover comprising a locking tab, wherein the locking tab is configured to be received within a slot in the first lens attachment when connected to the lens mount housing so as to prevent rotation of the first lens attachment.

21. The image-based code reader of claim 18, wherein at least one alignment feature of the lens mount and the first lens attachment are configured such that the lens mount and the first lens attachment are received in only substantially one orientation.

22. The image-based code reader of claim 18, wherein at least one alignment feature on the lens mount is at least one aligning tab and the at least one alignment feature on the first lens attachment is at least one key slot which is aligned with the at least one aligning tab when the first lens attachment is placed onto and removed from the lens barrel, and wherein the at least one aligning tab corresponds to a predetermined focal length of the imager lens assembly.

23. The image-based code reader of claim 22, wherein the at least one aligning tab is formed in a receptacle disposed in the lens mount and the at least one key slot is formed in a retaining flange.

24. The image-based code reader of claim 18, where in the variable focus element is a liquid lens.

25. The image-based code reader of claim 18, wherein the element housing includes at least one key slot aligned with the at least one aligning tab when placed onto and removed from the lens barrel.

26. The image-based code reader of claim 18, further comprising a controller configured to detect when the second removable lens attachment is coupled to the code reader.

27. The image-based code reader of claim 26, further comprising a controller configured to detect at least one of out-of-focus image data, a target distance, and an operator input; wherein the controller is further configured to generate an output voltage for the variable focus element when one of out-of-focus image data, a target distance, and an operator input is detected.

28. A modular focus system for an image-based code reader, the system comprising:
- a housing;
- a sensor adapted to capture image data reflected from a target object;
- a lens barrel coupled to a imager lens, the lens barrel rotatably coupled to the housing; and
- a plurality of removable lens attachments for adjusting the focus of the reader, the plurality of lens attachments including:
  - a manual focus lens module configured to be secured to the lens barrel such that rotation of the manual focus lens module translates into an axial movement of the imager lens relative to the sensor; and
  - a variable focus lens module configured to be secured to the lens barrel and electrically connected to a controller such that an output from the controller adjusts the focus of the code reader.

29. The image based code reader of claim 28, wherein the housing includes a receptacle.

30. The image based code reader of claim 29, wherein the lens barrel is at least partially disposed within the receptacle.

31. The image-based code reader of claim 28, where in the variable focus lens module is a liquid lens.

* * * * *